United States Patent
Kelnhofer et al.

(10) Patent No.: US 8,013,549 B2
(45) Date of Patent: Sep. 6, 2011

(54) COUNTER ELECTRO-MOTORIC FORCE BASED FUNCTIONAL STATUS DETECTION OF AN ELECTRO-MOTOR

(75) Inventors: Jürgen Kelnhofer, Jork (DE); Thomas Scherer, Hamburg (DE); Steffen Kalsow, Hamburg (DE); Alvy Biccum, East Longmeadow, MA (US); John Maljanian, Farmington, CT (US); David Leenhouts, Burlington, CT (US); Walter S. Hojnowski, Somers, CT (US)

(73) Assignees: Airbus Deutschland GmbH (DE); Hamilton Sundstrand Corporation, Windsor Locks, CT (US)

( * ) Notice: Subject to any disclaimer, the term of this patent is extended or adjusted under 35 U.S.C. 154(b) by 850 days.

(21) Appl. No.: 11/663,049

(22) PCT Filed: Sep. 17, 2004

(86) PCT No.: PCT/EP2004/010512
§ 371 (c)(1),
(2), (4) Date: Oct. 4, 2007

(87) PCT Pub. No.: WO2006/029648
PCT Pub. Date: Mar. 23, 2006

(65) Prior Publication Data
US 2008/0116837 A1 May 22, 2008

(51) Int. Cl.
*H02P 1/00* (2006.01)
(52) U.S. Cl. .......... 318/268; 318/567; 318/599
(58) Field of Classification Search .......... 318/268, 318/439, 599, 432, 434, 700, 400.37, 400.35
See application file for complete search history.

(56) References Cited

U.S. PATENT DOCUMENTS

| 4,422,040 | A | 12/1983 | Raider et al. |
| 5,032,781 | A | 7/1991 | Kronenberg |
| 5,287,050 | A | 2/1994 | Kronenberg et al. |
| 5,747,971 | A * | 5/1998 | Rozman et al. ........ 322/10 |
| 6,034,496 | A | 3/2000 | Male |
| 6,084,398 | A | 7/2000 | Howard |
| 6,112,156 | A | 8/2000 | Kang |
| 6,570,353 | B2 | 5/2003 | Krotsch et al. |
| 6,801,560 | B2 * | 10/2004 | Knowles et al. ........ 372/55 |
| 7,301,300 | B2 | 11/2007 | Larsson |
| 2002/0054451 | A1 * | 5/2002 | Moon et al. ........ 360/78.06 |

(Continued)

FOREIGN PATENT DOCUMENTS

CN 1324142 11/2001
(Continued)

OTHER PUBLICATIONS

Office Action from Japanese Application No. 2007-531603 dated Jun. 15, 2010.
(Continued)

*Primary Examiner* — Karen Masih
(74) *Attorney, Agent, or Firm* — Lerner, David, Littenberg, Krumholz & Mentlik, LLP

(57) ABSTRACT

The present invention relates to a circuit for detecting a functional status of an electro-motor. Typical electro-motors need additional components to identify the functional status of the motor. This means additional weight for such motors determining the functional status. According to the present invention a circuit is provided using a part of a motor as a sensor for detecting the functional status of the electro-motor.

9 Claims, 6 Drawing Sheets

U.S. PATENT DOCUMENTS

| | | |
|---|---|---|
| 2003/0117100 A1 | 6/2003 | Pigott et al. |
| 2003/0137271 A1 | 7/2003 | Haas et al. |

FOREIGN PATENT DOCUMENTS

| | | |
|---|---|---|
| DE | 103 47 208 A1 | 5/2004 |
| EP | 0046722 A2 | 3/1982 |
| EP | 0361209 A1 | 4/1990 |
| EP | 1 154 555 A2 | 11/2001 |
| GB | 2081533 A | 2/1982 |
| JP | 57-071297 A | 5/1982 |
| JP | 63099794 | 5/1988 |
| JP | 63206190 | 8/1988 |
| JP | 2-124000 A | 5/1990 |
| JP | 4197099 A | 7/1992 |
| JP | 05-227785 A | 9/1993 |
| JP | 8-98582 A | 4/1996 |
| JP | 09-317570 A | 12/1997 |
| JP | 10-136692 A | 5/1998 |
| JP | 10224979 | 8/1998 |
| JP | 2003134877 | 5/2003 |
| JP | 2003228898 | 8/2003 |
| RU | 2085020 | 7/1997 |
| SU | 1272413 | 11/1986 |
| SU | 1823119 A1 | 6/1993 |
| WO | 03105332 A1 | 12/2003 |

OTHER PUBLICATIONS

Office Action from Russian Application No. 2007112691/09(013782) dated Apr. 28, 2009.

Office Action from Japanese Application No. 2007-531603 dated Mar. 29, 2011.

\* cited by examiner

COUNTER ELECTRO-MOTORIC FORCE BASED FUNCTIONAL STATUS DETECTION OF AN ELECTRO-MOTOR

The present invention relates to the field of electro-motors. In particular the present invention relates to a circuit for detecting a functional status of an electro-motor and a corresponding method, and as well the present invention relates to a valve and an airplane comprising such a circuit.

Today electro-motors are widely used electromechanical converters to convert an electric current into a mechanical force. They are usually based on the physical phenomenon of electromagnetic forces. An electric current produces a magnetic field, which can have impact to another magnetic field near to the electric current. Therefore, an electric current can be used to turn a magnetic rotor of an electro-motor and a shaft, which is joined with the rotor.

On the other hand a changing magnetic field close to a wire produces a voltage in the wire. This voltage is known as counter electro-motoric force or back electro-motoric force. In this document the term counter electro-motoric force is used for such an electro-motoric force.

A stepper motor is a special kind of an electro-motor. Typically, it has a plurality of windings which are part of a stator and which have impact to a rotor wherein the rotor could be built from a permanent magnet. An advantage of a stepper motor is that, as it has a plurality of stator windings, thus, it can be exactly positioned. Therefore, for a stepper motor a driver is required which controls the plurality of windings of the stator. The driver of the stepper motor, for example, defines the direction in which the electro-motor is turning by controlled energizing the different windings of the electro-motor in a sequence corresponding to the direction of the turning. The driver of the stepper motor is also able to control the speed of the electro-motor.

Stepper motors can be used in a variety of applications where a controlled mechanical force is required and could be used for example to control a valve of an air conditioning system in an airplane. It is necessary to determine the position of the valve to be able to send the right control impulses to the electro-motor to control the aperture of the valve. Therefore, usually additional sensors are required to determine the position of the valve. These additional sensors mean additional weight, which could, in the case of airplanes, be a disadvantage.

Another option for determining the position of for example a valve would be to identify the functional status of the electro-motor, which is controlling the valve. Functional status means that by analyzing whether the electro-motor is turning or not and how long it is turning, the position of maybe a valve is determinable.

It is an objective of the present invention to provide an improved electronic circuit for detecting a functional status of an electro-motor.

According to an aspect of the present invention in accordance with one embodiment, the above objective may be solved by a circuit for detecting a functional status of an electro-motor, comprising a sensor and a detection unit wherein the sensor is a part of the electro-motor. The detection unit is adapted to detect the functional status of the electro-motor wherein the functional status of the electro-motor is one of a turning functional status and a locking functional status.

Advantageously, the circuit might be able to detect the actual status of the electro-motor. Thus it can identify if the electro-motor is turning or if it is locked. In the case where the shaft of the electro-motor is not blocked by an obstacle, the shaft might turn according to control signals, which the electro-motor receives by a driver of the electro-motor. If, otherwise, the shaft is locked then the electro-motor could indicate that something is blocking the shaft at the moment. Analyzing the functional status of the electro-motor might give a control unit the possibility to react according to the functional status.

The sensor being a part of the electro-motor advantageously may save weight in contrast to having an additional element to detect the functional status of the electro-motor. So an integrated sensor in the electro-motor could help to save weight of an airplane using a circuit according to the present invention.

According to another exemplary embodiment of the present invention, the sensor further comprises a coil wherein the coil is adapted such that a rotor of the electro-motor induces a counter electro-motoric force in the coil when the rotor is turning.

The induction of a counter electro-motoric force in the coil represents a feedback signal of the motor about the actual functional status. If the electro-motor is turning, including the turning of the rotor, the counter electro-motoric force is induced. This kind of a feedback signal might be seen as a translation of a mechanical value in an electronic value. This translation into an electronic value could make it possible to use an electronic circuit to analyse the actual functional status.

According to another exemplary embodiment of the present invention, the coil is a winding of a stator of the electro-motor. Using the stator winding of the electro-motor as a coil may allow to use of a part of the motor as the sensor. So it could be possible to gain a feedback signal from the electro-motor without having to have additional components for such a feedback mechanism.

According to another exemplary embodiment of the present invention, the circuit further comprises a differential amplifier. The differential amplifier comprises a first and a second input wherein the first input is connected to a supply voltage and the second input is connected to the coil.

A differential amplifier is able to subtract two input voltages and to generate at its output a signal representing the difference of the input voltages. As the counter electro-motoric force is a voltage as well as the supply voltage is a voltage it might be possible to compare these two signals by subtracting them.

According to another exemplary embodiment of the present invention, the differential amplifier comprises a first output. The differential amplifier is adapted to generate at this first output one of a first differential signal and a second differential signal. When the electro-motor is turning, the differential amplifier generates at its first output the first differential signal which corresponds to the turning functional status of the electro-motor. When the shaft of the electro-motor is locked and the electro-motor is blocked, at the first output of the differential amplifier the second differential signal is generated which corresponds to the locking functional status of the electro-motor. The first and the second differential signal differ at a sample time point. The sample time point lies in a sample time interval and can be used to sample the first and the second differential signal and to differ them.

Advantageously, at the first output of the differential amplifier a characteristic time dependent signal could be generated dependently of the functional status of the electro-motor. So only the output of the differential amplifier may has to be analyzed to detect the actual functional status of the electro-motor. As the output signal corresponding to the turning functional status and the output signal, corresponding to the locking functional status of the electro-motor, have different characteristics, they might be differentiated. It might be possible to differ both signals by just comparing one sample value taken at the sample time point to detect if the first or the second differential signal is the actual signal at the first output of the differential amplifier.

According to another exemplary embodiment of the present invention, the circuit further comprises a sample and hold circuit. The sample and hold circuit is connected to the first output of the differential amplifier. The sample and hold circuit is also connected to a driver of the electro-motor. The driver of the electro-motor is adapted to trigger the sample and hold circuit to sample one of the first differential signal and the second differential signal at the sample time point.

Advantageously, the sample and hold circuit is able to just measure a value at a defined time and store the value until the value is processed by a subsequent analyzer. Using the driver of the electro-motor as the trigger for the sample and hold circuit could make it possible to synchronize the sampling of the signal in accordance with a rotation of the electro-motor. The trigger time point is a periodical signal so it might relate to the rotation of the electro-motor.

As a winding of the stator of the electro-motor is used as a sensor it might be advantageous to adjust the sample time point to the rotation of the electro-motor. It might be that the winding of the stator is used to turn the motor. Therefore, the winding of the stator is loaded with a current to produce a magnetic field to turn the rotor wherein the rotor could comprise a permanent magnet. So in the time when the coil is loaded with current it may not be used to gather a counter electro-motoric force. The driver of the electro-motor knows when the coil is loaded with current and could therefore trigger the sample and hold circuit at a right time. The right time could be a moment in time when the first differential signal and the second differential signal differ and the coil is unloaded. As the sample and hold circuit the different time dependent first and second differential signals are reduced to discrete values representing the functional status of the electro-motor.

According to another exemplary embodiment of the present invention, the circuit further comprises a comparator. The comparator has a third and a fourth input and a second output. The third input of the comparator is connected to the sample and hold circuit. The fourth input of the comparator is connected to a reference voltage. The comparator is adapted to compare the third input with the fourth input and is able to provide at the second output a third signal wherein the third signal corresponds to the functional status of the electro-motor.

The comparator is able to compare two voltages. As the first differential signal and the second differential signal differ at the sample time point, advantageously it could be possible by comparing the third input of the comparator with a reference value, if the first or the second differential signal is available. In other words, the first and the second differential signals are periodical functions of a voltage over the time. The voltage of the first differential signal and the second differential signal differ at the sample time point. Sampling these periodical functions at the sample time point reduces the detecting of a time function to the detection of a discrete voltage value. To identify the actual discrete voltage value and to identify the actual functional status, the comparator is used. The discrete value at the second output of the comparator corresponds to the functional status of the electro-motor.

According to another exemplary embodiment of the present invention, the circuit further comprises a display wherein the display is adapted to show the functional status of the electro-motor. Providing a display advantageously can make it possible to visualize the functional status of the electro-motor. So it might be possible to quickly get an overview of the actual functional status of the electro-motor.

According to another exemplary embodiment of the present invention, the circuit further comprises a microprocessor. The microprocessor is adapted to send a control signal to the electro-motor wherein the control signal is one of a signal controlling the electro-motor to turn in a first direction and a signal controlling the electro-motor to turn in a second direction. The microprocessor further is adapted to determine the functional status of the electro-motor corresponding to the control signal. So the microprocessor is able by analyzing the functional status of the electro-motor to detect an operability of the electro-motor wherein the operability corresponds to a duration of a turning functional status between a first and a second locking functional status.

A microprocessor advantageously could be used to define the operability of a mechanical system, for example, it could be an indication for the operability of a mechanical system that a certain sequence of functional stati of the electro-motor follows a controlling signal. So it could be an indication of the operability of a system, that a certain duration for a turning functional status is detected between two locking functional stati. The microprocessor might advantageously be able to control the electro-motor and analyze the response of the electro-motor, so that the microprocessor just provides a signal whether the system is operable or not. This might be necessary to make checks of systems in an airplane before a maintenance.

Further advantageous exemplary embodiments of the present invention are also provided.

According to another exemplary embodiment of the present invention, a valve is provided which is controlled by an electro-motor comprising a circuit according to an exemplary embodiment of the present invention.

Usually valves are controlled by electro-motors. For determining the operability usually these valves have additional position detectors. Using an electro-motor with a circuit according to the present invention could make it possible to use a valve without additional position detectors. Therefore, it could be possible to save weight for such a valve.

Another exemplary aspect concerns an airplane comprising a circuit according to the present invention.

According to another exemplary embodiment of the present invention, a method for detecting a functional status of an electro-motor by means of a sensor, which is part of the electro-motor, is provided.

According to another exemplary embodiment of the present invention, a method for detecting a functional status of an electro-motor is provided. A rotor of an electro-motor is turning in a first direction and induces a counter electro-motoric force in a coil. This counter electro-motoric force can be compared with a supply voltage and one of a first differential signal and a second differential signal can be generated. The first differential signal corresponds to a turning functional status of the electro-motor and the second differential signal corresponds to a locking functional status of the electro-motor. The first and the second differential signal differ at a sample time point. So one of the first differential signal and the second differential signal is sampled at the sample time point. One of the first differential signals and the second differential signal is compared with a reference voltage and so the functional status of the electro-motor is determined and can be provided.

It may be seen as the gist of the exemplary embodiment of the present invention that a functional status of an electro-motor can be provided by using a circuit in combination with a sensor, wherein the sensor is a part of the electro-motor. This allows weight to be saved for a system which is able to determine the functional status of the electro-motor.

These and other aspects of the present invention will become apparent from and elucidated with reference to the embodiments described hereinafter.

Exemplary embodiments of the present invention will be described in the following with reference to the following drawings.

Figure 5:
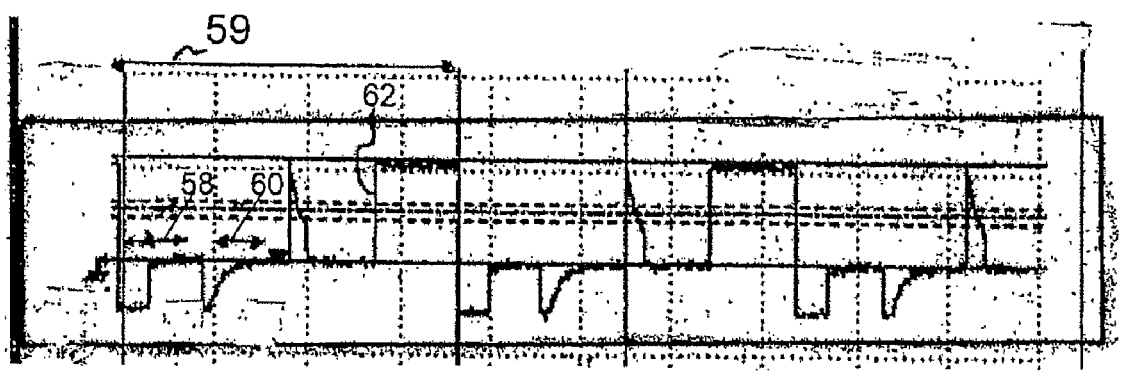

FIG. 5 a shows a time diagram of a second differential signal representing a locking functional status.

Figure 6:
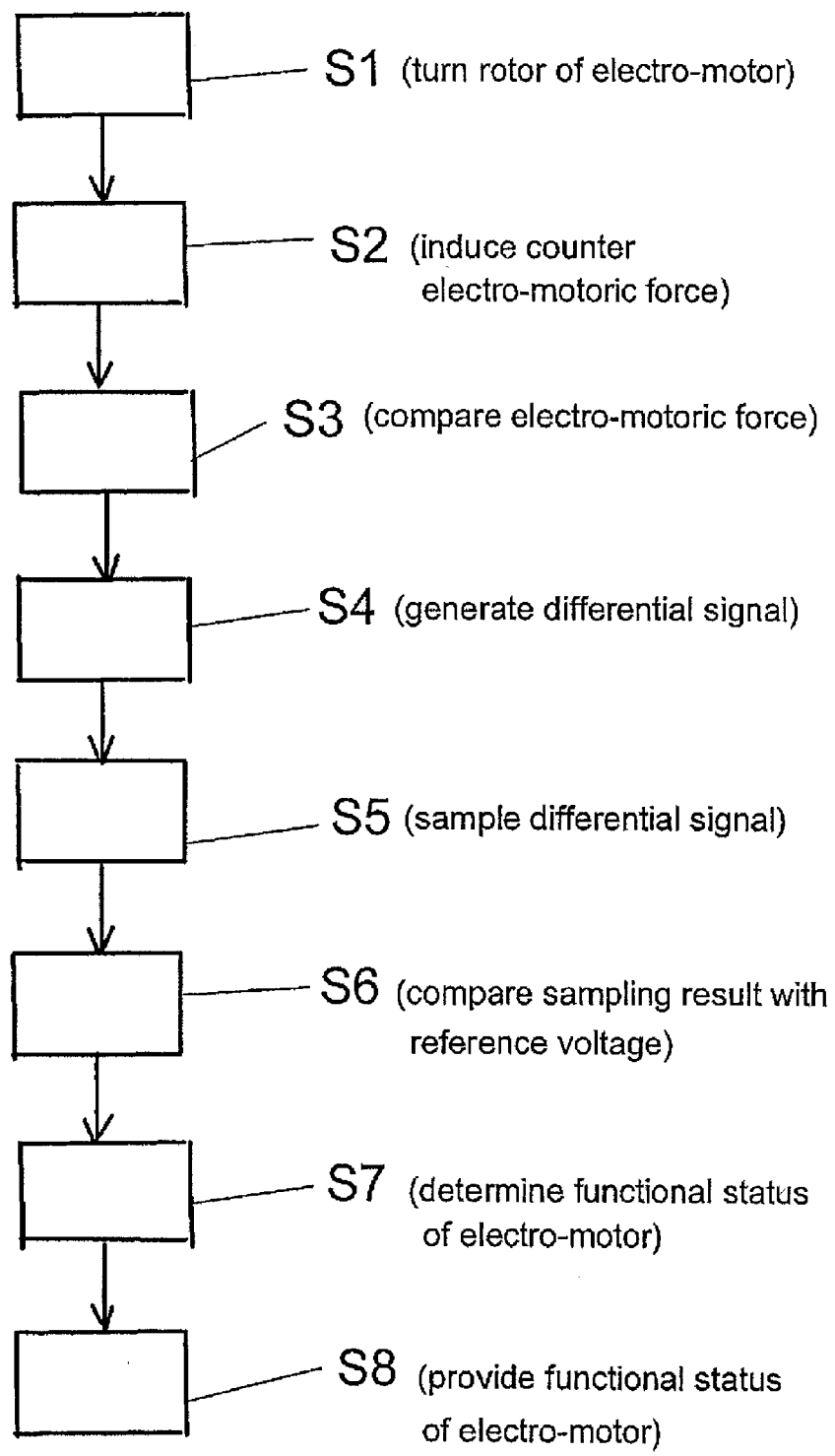

FIG. 6 shows a flowchart of a method for detecting a functional status of an electro-motor.

Figure 7:
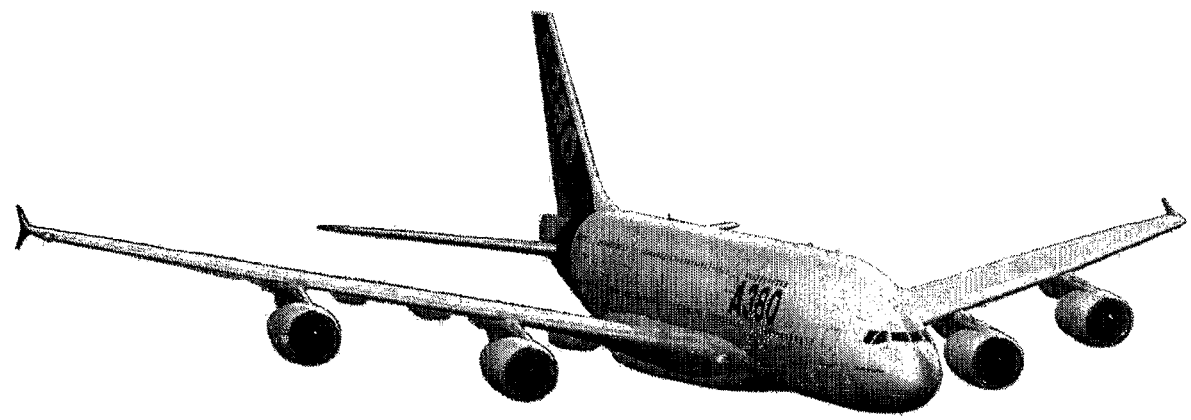

FIG. 7 shows an aircraft comprising a circuit according to the present invention.

Figure 1:
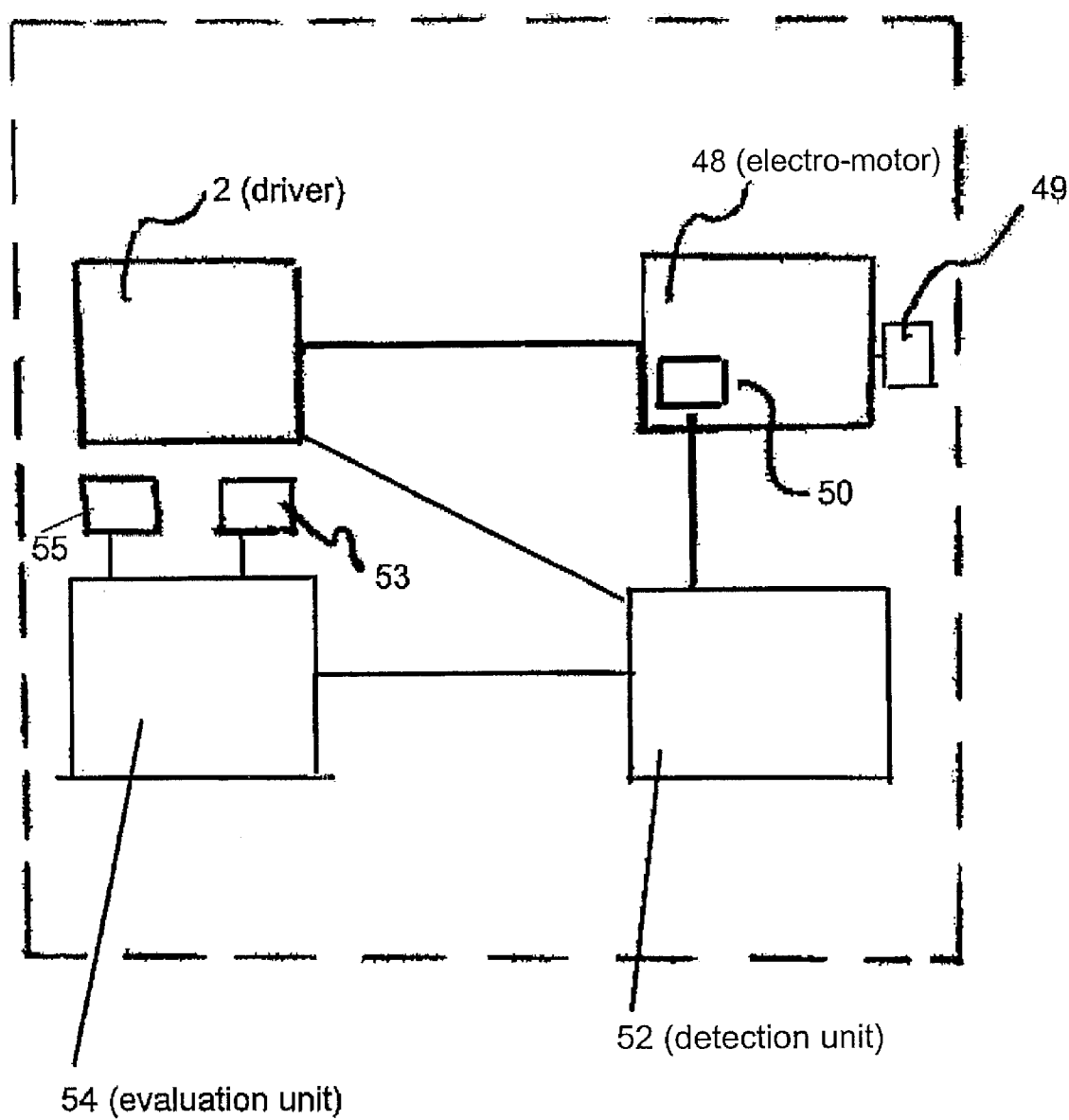
FIG. 1 shows a symbolic block diagram of an exemplary embodiment of the present invention.

FIG. 1 shows a symbolic block diagram of an exemplary embodiment of the present invention. The block indicated by number 2 represents a driver for the stepper motor 48. The driver 2 is responsible for defining a direction in which the stepper motor is turning and a rotation speed of the stepper motor 48. Therefore, the driver 2 sends controlling signals to the stepper motor 48. The stepper motor 48 can be used to move a mechanical system like a valve 49. In the stepper motor 48 a sensor 50 is integrated which is able to identify the functional status of the electro-motor 48. The sensor 50 might be a coil of the stepper motor 48 with the advantage that no additional devices need to be added to the stepper motor 48 to determine the actual status of the stepper motor 48.

The signals determined by the sensor 50 are received by a functional status detection unit 52. The functional status detection circuit 52 is an electronic circuit, which is able to deliver discrete signals in accordance with a functional status of the stepper motor 48. There are two possible functional stati of the stepper motor 48, namely, a turning functional status, corresponding to a turning of the stepper motor 48 and the shaft 56, and a locking functional status, corresponding to a locking status of the stepper motor 48 and the shaft 56. The functional status detection unit 52 is triggered by the stepper motor driver 2. Therefore a connection between the functional status detection unit 52 and the stepper motor driver 2 is available.

A discrete functional status value provided by the functional status determination circuit 52 is provided to an evaluation unit 54. The evaluation unit 54 can for example be a display 53 which shows the actual functional status or a microprocessor 55 which is able to process the received functional status and to analyze the signals. A microprocessor 55 might be necessary if a sequence of functional stati has to be analyzed.

Figure 2:
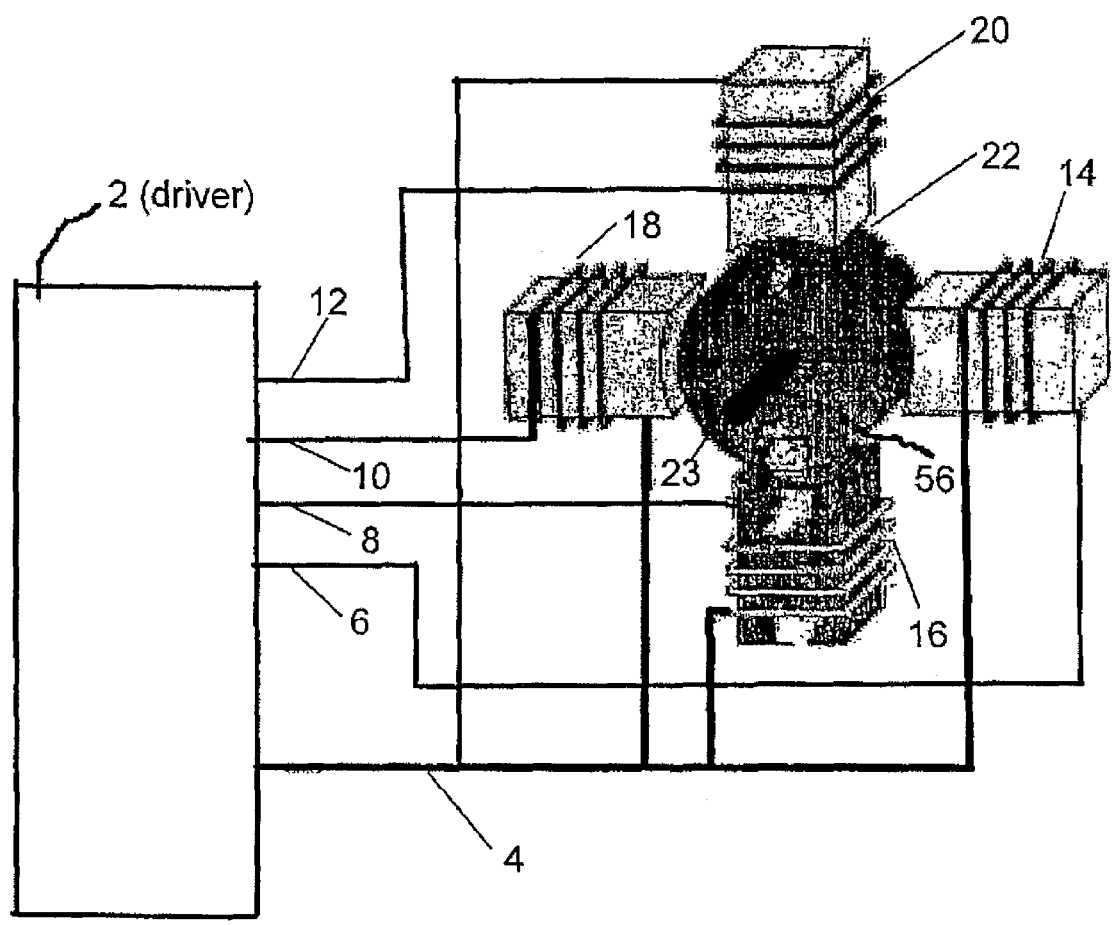
FIG. 2 shows a schematic representation of a stepper electro-motor.

FIG. 2 shows the schematic representation of a stepper electro-motor 48. The stepper motor 48 comprises a rotor comprising a permanent magnet with a magnetic south pole 22 and a magnetic north pole 23. In the middle of the rotor a shaft 56 is positioned which rotates if the stepper motor 48 is switched on. Crosswise around the rotor in steps of 90 degrees the stators of the stepper motor 48 are positioned. The stators comprise windings 14, 16, 18 and 20 and cores surrounded by the windings. A current flowing through each of the windings 14, 16, 18 and 20 causes the stator to build a magnetic pole. This polarity of the stator attracts the relevant pole 22 or 23 of the rotor. With the rotor also the shaft 56 turns since the rotor is in a stable position wherein opposite poles lie opposite to each other.

To rotate the electro-motor 48 the stepper motor driver 2 controls the flow of the current through the windings 14, 16, 18 and 20 in an alternating sequence. In other words, to rotate the rotor and shaft 56, for example, clockwise, the driver 2 loads a current in the first phase 6 to let the current flow from the voltage supply 4 through winding 14 back to the first phase 6 producing a magnetic polarity on the stator winding 14 which attracts the relevant magnetic pole 22 or 23. Then the driver 2 switches the current onto the second phase 8 and lets the current flow from the voltage supply 4 to winding 16 back to the second phase 8. The stator of winding 16 has now the same magnetic polarity that had have before the stator of winding 14 and now the magnetic field of winding 16 attracts the pole 22 of the rotor which results in a rotation of 90 degrees of the shaft. The same is then done with the third phase 10 and winding 18 and then with the fourth phase 12 and winding 20. Then it starts again with the first phase 6 and winding 14. To rotate the shaft 56 in the other direction the sequence is run through in the reverse order.

As can be seen from the above, to rotate the shaft of a stepper motor a winding of the stator is only energized for a short time. In the rest of the time a winding is not energized by the driver 2 so that the physical phenomenon of induction generates in a free winding a counter electro-motoric force (EMF). The counter EMF only appears as long as the rotor comprising the permanent magnet 22, 23 is in rotation. So the presence of an EMF is an indication of a turning functional status of the stepper motor 48.

Figure 3:
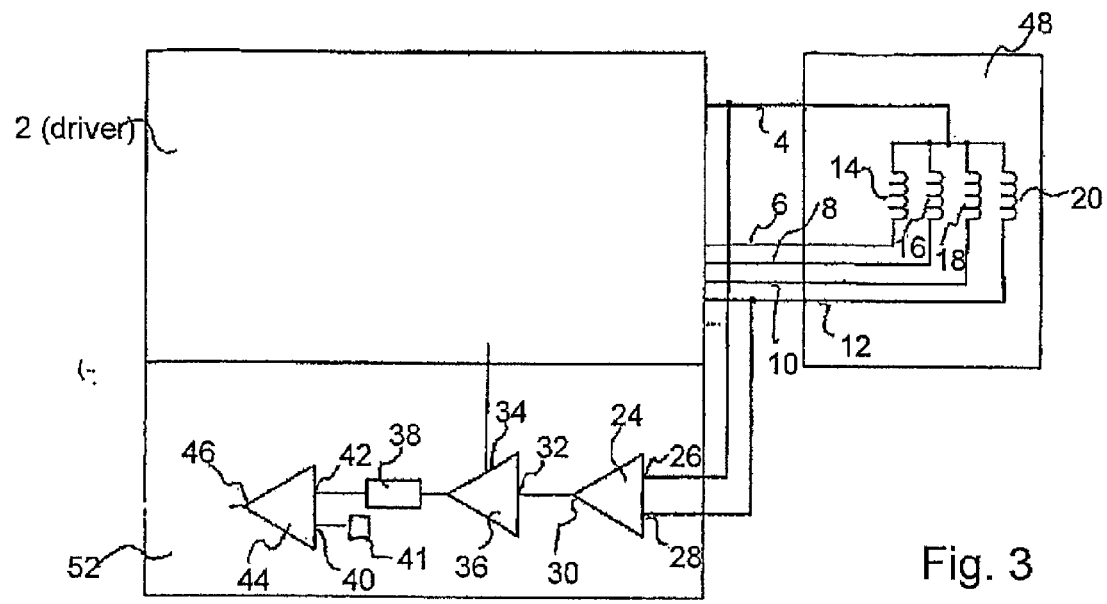
FIG. 3 shows a logical structural layout of a circuit for detecting a functional status of an electro-motor according to an exemplary embodiment of the present invention.

FIG. 3 shows a logical structural layout of a circuit for detecting a functional status of an electro-motor 48 according to an exemplary embodiment of the present invention. The figure shows the driver 2 which controls the stepper motor 48. By energizing in a defined sequence the phases 6, 8, 10 and 12 and also the relevant windings 14, 16, 18 and 20 of the stator of the electro-motor 48, the driver 2 invokes a rotation of the electro-motor 48 and the shaft 56. The circuit 52 for detecting the functional status of the electro-motor 48 is connected to the lead 4 and to one of the phases 6, 8, 10 or 12. Lead 4 has the potential of a supply voltage. In FIG. 3 circuit 52 for detecting the functional status of the electro-motor 48 is connected to the fourth phase 12. The supply voltage 4 is connected to the first input of the differential amplifier 24. The signal of phase 12 is connected to the second input 28 of the differential amplifier 24.

The signal of phase 12 is a voltage too. The amplifier 24 subtracts the signals on the first input 26 and on the second input 28 and provides the result on the first output 30. Dependent on the functional status of the electro-motor 48 the signal on the second input 28 of the differential amplifier has a characteristic format. Thus, the signal provided at the first output 30 has a characteristic format as well. It is a function of a voltage over the time. Two different formats of the signal at the first output 30 of the differential amplifier can be differentiated.

The first differential signal 64 corresponds to the turning functional status of the electro-motor 48. The second differential signal 62 corresponds to the locking functional status of the electro-motor 48. Both these differential signals are periodical signals and the difference between them is most obvious at a sample time point, which lies in a sample time interval 58, 60. The relevant differential signal of output 30 is provided to input 32 of the sample hold circuit 36. The sample and hold circuit 36 is able to sample an input signal at a defined time point. The time point when the sample and hold circuit 36 samples the input signal on input 32 is defined by the trigger connected to input 34 of the sample and hold circuit. The input 34 is connected to the driver 2 of the stepper motor 48. The driver 2 has detailed information about the rotation of the rotor. Therefore, it is possible to trigger the sample and hold circuit 36 at the time point when the first differential signal corresponding to a turning functional status of the electro-motor 48 and the second differential signal corresponding to a locking functional status of the electro-motor 48 differ most obviously. Sampling the signal on input 32, which is one of the first differential signals 64 and the second differential signal 62 at the sample time point makes it easier to detect the actual differential signal. The sample value of the sample and hold circuit 36 is provided to a low pass filter 38 to smooth the signal before the signal receives the third input 42 of a comparator 44.

The fourth input 40 of the comparator 44 is connected to a reference voltage 41. The comparator 44 is able to compare the signal on the third input 42 with the signal on the input 40 and indicate if the signal on input 42 is lower or higher as the reference voltage 41 of the fourth input 40. If the signal on the third input 42 is lower than the reference voltage 41 of the fourth input 40, the result on the second output 46 of the comparator 44 indicates the turning functionality of the electro stepper motor.

Otherwise, if the signal on the third input 42 is higher than the reference voltage 41, the signal on the second output 46 indicates the locking status of the electro stepper motor 48. Therefore, the signal at the second output 46 of the comparator 44 is a discreet value indicating the functional status of the motor. The signal, for example, could be used by a post processor, for example, for visualizing the status on a display 53 or the signal could be used analyzing the functional status with a microprocessor 55.

It is possible to use a microprocessor 55 as an evaluation unit 54 to send a control signal to the driver 2. The microprocessor 55 controls the electro-motor 48 via the driver 2 with a program which would be used under normal conditions. For example, the electro-motor 48 could be used to control a valve. An operational condition for a valve 49 means that, for example, in a closed position the shaft of a motor is locked. This locking functional status has to be detected by the micro-controller. Then the micro-controller can switch the direction for turning the electro-motor 48 and as a result it will receive, on the second output 46 of the comparator 44, a signal corresponding to the turning functional status of the electro-motor 48. This signal will be received by the evaluation unit 54 for a certain duration of time until the valve 49 will lock the shaft 56 of the electro-motor 48 indicating that it reached an end position. From that moment on the microprocessor 55 again will receive a locking functional status of the electro-motor 48. By analyzing the sequence of the locking functional status and the turning functional status in combination with the duration for the turning functional status the microprocessor 55 will be able to identify the operability of the valve.

Figure 4:
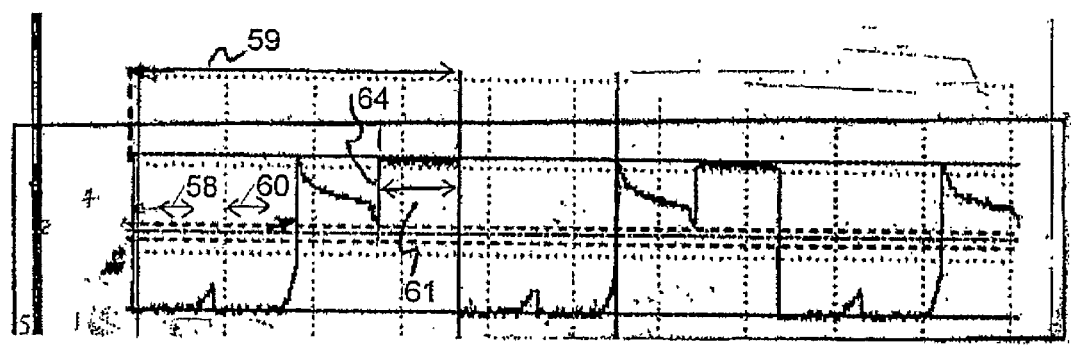
FIG. 4 shows a time diagram of a first differential signal representing a turning functional status.

FIG. 4 shows a time diagram of a first differential signal 64 representing the turning functional status. The figure shows a plot of the first differential signal 64. On the x-axis the time is printed and on the ordinate the voltage of the signal 64. For example, the shaft 56 of the stepper motor 48 is turning with 540 steps per second. The first differential signal 64 is taken from the first output 30 of the differential amplifier 24 when the electro-motor 48 is turning without being blocked. As can be seen from FIG. 4 the first differential signal 64 is a peri-odical signal. Therefore the signal is repeated after a duration 59. A periodical signal is typical for rotations. Comparing the first differential signal 64 with the second differential signal 62 it can be seen that in the time intervals 58 and 60 both signals 64 and 62 differ most obviously. For example, the value for the first differential signal 64 in the area of 58 and sample interval 60 can be −16 Volt. So sampling the first differential signal 64 at a time point of the interval 58 or 60 is most reliable for the differentiation of the first differential signal 64 and the second differential signal 62. In the last quarter of the signal 64 a rectangular format 61 of the signal 64 can be seen. In this example the signal 64 is generated by subtracting the supply voltage on lead 4 and the signal on the fourth phase 12. The rectangular area 61 is the area when phase 12 and winding 20 are energized by the driver 2 and cannot be used for detecting the signal.

FIG. 5 shows the time diagram for a second differential signal representing a locking functional status. Similar to FIG. 4, FIG. 5 shows the second differential signal 62 at the first output 30 of the differential amplifier 24. On the x-axis the time is printed and on the ordinate the voltage of the signal 62. The electro-motor 48 is controlled by the driver 2 to rotate with 540 steps per second but the motor shaft is locked. The value of the signal in the sample time interval 58 and 60 is 0 Volt. So taking a sample time point in the time interval 58 or 60 makes it possible, with high reliability, to differentiate between the first differential signal 64 and the second differential signal 62 by just sampling one value at the sample time point.

FIG. 6 shows a flowchart of a method for detecting a functional status of an electro-motor. Step S1 indicates that the rotor of an electro-motor is turning in a first direction. While the rotor is turning, and as the rotor comprises the poles 22 and 23 of a permanent magnet, in step S2 a counter electro-motoric force is induced in the coil 14, 16, 18 or 20 dependent on the position of the poles 22 and 23 of the permanent magnet of the rotor. Comparing the counter electro-motoric force of the supply voltage 4 by subtracting the counter electro-motoric force and the supply voltage 4 in step S3 generates in step S4 one of a first differential signal 64 and a second differential signal 62. The first differential signal 64 corresponds to a turning functional status of the electro-motor. The second differential signal 62 corresponds to a locking functional status of the electro-motor 48. In step S5 the relevant differential signal is sampled at the sample time point. The result signal of the sampling in step S6 is compared with a reference voltage 41. In step S7 the actual functional status of the electro-motor is determined and in step S8 the functional status of the electro-motor 48 is provided.

FIG. 7 shows an aircraft comprising a circuit according to the present invention.

It should be noted that the term "comprising" does not exclude other elements or steps and the "a" or "an" does not exclude a plurality and that a single processor or system may fulfil the functions of several means recited in the claims. Also elements described in association with different embodiments may be combined.

It should also be noted that any reference signs in the claims shall not be construed delimiting the scope of the claims.

The invention claimed is:
1. Circuit for detecting a functional status of an electro-motor, the circuit comprising:
   a sensor;
   a detection unit;
   wherein the sensor is a part of the electro-motor;

wherein the detection unit is adapted to detect the functional status of the electro-motor;
wherein the functional status of the electro-motor is one of a turning functional status and a locking functional status;
wherein the sensor further comprises a coil;
wherein the coil is adapted such that a rotor of the electro-motor induces a counter electro-motoric force in the coil when it is turning;
wherein the coil is a winding of a stator of the electro-motor;
wherein the detection unit further comprises a differential amplifier;
wherein the differential amplifier comprises a first and a second input;
wherein the first input is connected to a supply voltage;
wherein the second input is connected to the coil;
wherein the differential amplifier further comprises a first output;
wherein the differential amplifier is adapted to generate at the first output one of a first differential signal and a second differential signal;
wherein the first differential signal corresponds to the turning functional status of the electro-motor;
wherein the second differential signal corresponds to the locking functional status of the electro-motor;
wherein the first differential signal and the second differential signal differ at a sample time point;
wherein the sample time point lies in a sample time interval.

2. The circuit of claim 1, wherein the detection unit further comprises:
a sample and hold circuit;
wherein the sample and hold circuit is connected to the first output of the differential amplifier;
wherein the sample and hold circuit is connected to a driver of the electro-motor;
wherein the driver of the electro-motor is adapted to trigger the sample and hold circuit to sample one of the first differential signal and the second differential signal at the sample time point.

3. The circuit of claim 2, wherein the detection unit further comprises:
a comparator;
wherein the comparator has a third and a fourth input;
wherein the comparator has a second output;
wherein the third input of the comparator is connected to the sample and hold circuit;
wherein the fourth input of the comparator is connected to a reference voltage;
wherein the comparator is adapted to compare the third input with the fourth input;
wherein the comparator is adapted to provide at the second output a third signal;
wherein the third signal corresponds to the functional status of the electro-motor.

4. The circuit of claim 3, further comprising:
a display;
wherein the display is adapted to show the functional status of the electro-motor.

5. The circuit of claim 3, further comprising:
a microprocessor;
wherein the microprocessor is adapted to send a control signal to the electro-motor;
wherein the control signal is one of a signal controlling the electro-motor to turn in a first direction and a signal controlling the electro-motor to turn in a second direction;
wherein the microprocessor is adapted to determine the functional status of the electro-motor corresponding to the control signal;
wherein the microprocessor is adapted to analyze the functional status of the electro-motor;
wherein the microprocessor is adapted to detect an operability of the electro-motor;
wherein the operability corresponds to a duration of a turning functional status between a first and a second locking functional status.

6. The circuit of claim 1,
wherein the electro-motor is a stepper motor.

7. Valve, controlled by an electro-motor,
wherein the electro-motor comprises the circuit of claim 1.

8. Airplane, comprising the circuit of claim 1.

9. Method for detecting a functional status of an electro-motor comprising the steps of:
detecting a functional status of an electro-motor by means of a sensor which is part of the electro-motor;
turning a rotor of an electro-motor in a first direction;
inducing a counter electro-motoric force in a coil;
comparing the counter electro-motoric force with a supply voltage;
generating one of a first differential signal and a second differential signal;
wherein the first differential signal corresponds to a turning functional status of the electro-motor;
wherein the second differential signal corresponds to a locking functional status of the electro-motor;
wherein the first differential signal differs from the second differential signal at a sample time point;
sampling one of the first differential signal and the second differential signal at the sample time point;
comparing one of the first differential signal and the second differential signal with a reference voltage;
determining the functional status of the electro-motor;
providing the functional status of the electro-motor.

* * * * *